United States Patent
Takigawa et al.

(10) Patent No.: US 7,749,312 B2
(45) Date of Patent: Jul. 6, 2010

(54) AIR CONDITIONING SYSTEM

(75) Inventors: Kenji Takigawa, Nishio (JP); Tetsuo Toyama, Chiryu (JP); Hitoshi Hayashi, Gifu (JP)

(73) Assignee: Denso Corporation, Kariya (JP)

( * ) Notice: Subject to any disclaimer, the term of this patent is extended or adjusted under 35 U.S.C. 154(b) by 544 days.

(21) Appl. No.: 11/728,590

(22) Filed: Mar. 26, 2007

(65) Prior Publication Data

US 2007/0227358 A1    Oct. 4, 2007

(30) Foreign Application Priority Data

Mar. 28, 2006    (JP)    .............................. 2006-088666

(51) Int. Cl.
*B01D 53/22*    (2006.01)
*B01D 53/02*    (2006.01)

(52) U.S. Cl. .................. 96/11; 96/9; 96/12; 96/153; 96/154; 96/417; 95/11; 95/12; 95/45; 95/51; 95/54; 95/129; 95/137; 95/143; 55/385.2; 55/385.3; 55/524; 454/69; 454/75; 454/141

(58) Field of Classification Search .............. 96/4, 96/8, 9, 10, 11, 12, 108, 153, 154, 417; 95/8, 95/11, 12, 45, 51, 54, 129, 137, 143, 145; 55/385.2, 385.3, 385.4, 524; 454/69, 75, 454/139, 141
See application file for complete search history.

(56) References Cited

U.S. PATENT DOCUMENTS

| | | | | | |
|---|---|---|---|---|---|
| 3,403,612 | A | * | 10/1968 | Swet et al. | ..................... 454/70 |
| 6,113,484 | A | * | 9/2000 | Tebbe | ............................... 96/4 |
| 6,527,228 | B2 | * | 3/2003 | Mitani | .......................... 454/76 |
| 6,596,057 | B2 | * | 7/2003 | Edlund et al. | ..................... 96/4 |
| 6,602,330 | B2 | * | 8/2003 | Allen | ......................... 55/385.3 |
| 6,726,751 | B2 | * | 4/2004 | Bause et al. | ................... 96/153 |
| 2002/0116946 | A1 | * | 8/2002 | Choi et al. | ..................... 62/655 |
| 2008/0207107 | A1 | * | 8/2008 | Matsuo et al. | .............. 454/152 |

FOREIGN PATENT DOCUMENTS

JP    06-193525    7/1994
JP    2004-203367    *    7/2004

* cited by examiner

*Primary Examiner*—Jason M Greene
(74) *Attorney, Agent, or Firm*—Harness, Dickey & Pierce, PLC (57) ABSTRACT

An air conditioning system comprising a gas-impermeable wall defining a space for air conditioning, and a selective separating member disposed in the wall as a part of the wall, having a function of allowing preferential permeation of oxygen and carbon dioxide and at the same time, blocking the permeation of hydrocarbon, nitrogen oxide, sulfur oxide and a fine solid component, in which the selective separating member comprises an organic polymer and satisfies the relationship of P1/P2>10 wherein P1 is the permeation coefficient of oxygen and carbon dioxide and P2 is the permeation coefficient of hydrocarbon, nitrogen oxide, sulfur oxide and a fine solid component.

13 Claims, 6 Drawing Sheets

AIR CONDITIONING SYSTEM

BACKGROUND THE INVENTION

1. Field of the Invention

The present invention relates to an air conditioning system capable of preventing a harmful gas or harmful fine particles from intruding into the air conditioning space as much as possible.

2. Description of the Related Art

Conventionally, an automobile is equipped with an air conditioner having an outer air introduction mode of introducing air from outside the cabin and feeding it into the cabin after heating or cooling the air and an inner air circulation mode of heating or cooling air in the cabin while circulating the air. In recent years, for example, the precision of vehicle assembly has increased as a measure for enhancing the performance of blocking intrusion of noise into the cabin, and the closing off of cabin has also increased.

When the closing off of a vehicle cabin is increased in this way, when several occupants ride in the vehicle for a long time, reduction of oxygen concentration or an increase in carbon dioxide concentration occurs and the occupants may suffer from headaches or feel uncomfortable. In order to solve this problem, there is known a technique of using a filter having a permeation membrane capable of discharging carbon dioxide out of the cabin and allowing the permeation of oxygen from the outside of the vehicle cabin into the cabin, thereby preventing an increase in carbon dioxide concentration and decrease of oxygen concentration in the vehicle cabin while maintaining a comfortable interior (see, for example, Japanese Unexamined Patent Publication (Kokai) No. 2004-203367).

SUMMARY OF THE INVENTION

In an air conditioning system using the above-described filter, oxygen or carbon dioxide can permeate the air, and therefore the oxygen concentration in the vehicle cabin can be kept constant, but hydrocarbons (hereinafter sometimes simply referred to as "HC"), nitrogen oxide (hereinafter sometimes simply referred to as "NOx") and a fine solid component (also called a suspended particular matter and hereinafter sometimes simply referred to as "SPM"), which are exhausted in a large amount particularly from a diesel engine vehicle such as a truck, are also allowed to permeate together with oxygen or carbon dioxide.

Accordingly, when driving in a city or on a highway having a high traffic volume of trucks or the like or when driving behind a diesel engine vehicle such as a truck, the above contaminants can intrude into the vehicle cabin and comfort in the cabin cannot be elevated.

The present invention has been made by taking into consideration these problems and an object of the present invention is to prevent a contaminant from intruding into the air conditioning space and provide comfort to a person located in the air conditioning space.

According to the present invention, the above object is attained by the air conditioning system of the present invention which will be described hereinafter.

The present invention is summarized as described in the following items (1) to (17).

(1) An air conditioning system comprising a gas-impermeable wall defining the space for air conditioning, i.e., objective space to be air conditioned, and a selective separating member disposed in the wall as a part of the wall, and having a function of allowing preferential permeation of oxygen and carbon dioxide and at the same time, blocking the permeation of hydrocarbons, nitrogen oxide, sulfur oxide and a fine solid component, in which the selective separating member comprises an organic polymer and satisfies the relationship of $P1/P2>10$ wherein P1 is the permeation coefficient of oxygen and carbon dioxide and P2 is the permeation coefficient of hydrocarbons, nitrogen oxide, sulfur oxide and a fine solid component.

(2) The air conditioning system as set forth in item 1, wherein the selective separating member has a porous shape, a fibrous shape, a thin film shape or a composite shape thereof.

(3) The air conditioning system as set forth in item 2, wherein the selective separating member has a porous shape having a pore diameter of 5 nm or less.

(4) The air conditioning system as set forth in item 2, wherein the selective separating member has a fibrous shape having a function of blocking the permeation of hydrocarbons, nitrogen oxide, sulfur oxide and a fine solid component.

(5) The air conditioning system as set forth in item 2, wherein the selective separating member has a thin film shape having a thickness of 500 nm or less.

(6) The air conditioning system as set forth in any one of items 1 to 5, wherein the function of the selective separating member of blocking the permeation of hydrocarbons, nitrogen oxide, sulfur oxide and a fine solid component is achieved by adsorption, absorption, decomposition or surface reaction.

(7) The air conditioning system as set forth in any one of items 1 to 6, wherein the organic polymer comprises a composition having electrical conductivity.

(8) The air conditioning system as set forth in any one of items 1 to 7, wherein the selective separating member has a surface roughness of 6.0 nm or more.

(9) The air conditioning system as set forth in any one of items 1 to 8, wherein the selective separating member comprises:

a first selective separating member having the function of allowing preferential permeation of oxygen and carbon dioxide, and a second selective separating member having the function of blocking the permeation of hydrocarbons, nitrogen oxide, sulfur oxide and a fine solid component.

(10) The air conditioning system as set forth in item 9, wherein the first selective separating member and the second selective separating member are constructed to be in close contact and the selective separating member is supported by a support layer, on at least one side of the first and second selective separating members constructed to be in close contact.

(11) The air conditioning system as set forth in item 10, wherein the selective separating member comprises a first support layer having incorporated therein the first selective separating member and a second support layer having incorporated therein the second selective separating member.

(12) The air conditioning system as set forth in item 11, wherein the first selective separating member has a gradiently changed permeation ratio of oxygen and carbon dioxide in the permeation direction in the first support layer and the second selective separating member has a gradiently changed permeation ratio of hydrocarbons, nitrogen oxide, sulfur oxide and a fine solid component in the permeation direction in the second support layer.

(13) The air conditioning system as set forth in any one of items 1 to 12, wherein deodorizing means for deodorization is further provided in the space for air conditioning.

(14) The air conditioning system as set forth in any one of items 1 to 13, wherein outer air introducing means for the introduction of outer air is provided in the space for air conditioning.

(15) The air conditioning system as set forth in item 14, wherein the outer air introducing means is constructed to be capable of adjusting the volume of outer air introduced into the space for air conditioning, based on arbitrarily set outer-air volume introduction conditions.

(16) The air conditioning system as set forth in item 15, wherein a sensor for detecting the gas concentration in the space for air conditioning is further provided and the outer air introducing means is constructed to be capable of adjusting the volume of outer air introduced into the space for air conditioning, based on the value of gas concentration detected by a sensor with respect to a gas concentration value set as the outer-air volume introduction conditions.

(17) The air conditioning system as set forth in any one of items 1 to 16, wherein the space for air conditioning is a space for receiving occupants in a vehicle.

DESCRIPTION OF THE PREFERRED EMBODIMENTS

The air conditioning system of item 1 described above was made in order to attain the above object. The air conditioning system comprises a wall constituting the space for air conditioning and not allowing the permeation of a gas, and a selective separating member. The selective separating member has a function of allowing preferential permeation of oxygen and carbon dioxide and at the same time, blocking the permeation of hydrocarbons, nitrogen oxide, sulfur oxide and a fine solid component.

The "wall not allowing the permeation of a gas" as used herein means a wall which does not allow the permeation of a gas and dust or the like having a molecular structure larger than that of a gas. Also, the "selective separating member allowing preferential permeation of oxygen and carbon dioxide" means a selective separating member which allows the permeation of only oxygen and carbon dioxide.

The "selective separating member blocking the permeation of hydrocarbons, nitrogen oxide, sulfur oxide and a fine solid component" means ideally a selective separating member which almost completely blocks hydrocarbons, nitrogen oxide, sulfur oxide and a fine solid component.

The property of this selective separating member can be explained as follows using the level of the value of the permeation coefficient P represented by a product of solubility coefficient S and a diffusion coefficient D.

The selective separating member can readily dissolve oxygen or carbon dioxide. That is, this member has a high solubility coefficient S for oxygen or carbon dioxide. Therefore, oxygen and carbon dioxide can be readily taken into the selective separating member through the contact surface of the member, namely, the surface of the selective separating member with oxygen or carbon dioxide.

Furthermore, the selective separating member has a high diffusion coefficient D for oxygen or carbon dioxide, so that oxygen or carbon dioxide taken in from the selective separating member surface can easily migrate within the selective separating member from the high concentration side to the low concentration side.

In this way, both the solubility coefficient S and the diffusion coefficient D of the selective separating member for oxygen or carbon dioxide are high and in turn, the permeation coefficient P becomes high. Accordingly, oxygen or carbon dioxide can permeate the member.

On the contrary, the selective separating member cannot readily dissolve hydrocarbons, nitrogen oxide, sulfur oxide and a fine solid component. That is, the selective separating member has a small solubility coefficient S for hydrocarbons, nitrogen oxide, sulfur oxide and a fine solid component. Therefore, these components cannot readily be taken into the selective separating member through the surface thereof.

Also, the selective separating member has a low diffusion coefficient D for hydrocarbons, nitrogen oxide, sulfur oxide and a fine solid component, so that these components, even if taken in the selective separating member from the selective separating member surface, cannot easily migrate within the selective separating member.

In this way, both the solubility coefficient S and the diffusion coefficient D of the selective separating member for hydrocarbons, nitrogen oxide, sulfur oxide and a fine solid component are low and in turn, the permeation coefficient P becomes low. Accordingly, hydrocarbons, nitrogen oxide, sulfur oxide and a fine solid component can be blocked.

According to such an air conditioning system, discharge of carbon dioxide out of the objective space for air conditioning and introduction of oxygen into the space for air conditioning can be caused to take place by utilizing the concentration difference of each of the oxygen and carbon dioxide between the inside and the outside of the space for air conditioning and at the same time, hydrocarbons, nitrogen oxide, sulfur oxide and a fine solid component can be blocked, so that the inside of the space for air conditioning can be kept comfortable.

More specifically, when an occupant or the like is present in the space for air conditioning, the oxygen concentration in the space for air conditioning gradually decreases and the carbon dioxide concentration gradually increases. Since the oxygen concentration and carbon dioxide concentration outside the space for air conditioning are constant, there are generated concentration differences such that the oxygen concentration is high outside the space for air conditioning and low in the space for air conditioning, however on the other hand, the carbon dioxide concentration is low outside the objective space for air conditioning and high in the space for air conditioning.

At this time, the selective separating member has a high permeation coefficient P for oxygen or carbon dioxide and therefore, oxygen or carbon dioxide after dissolving in the selective separating member diffuses from the high concentration side to the low concentration side, that is, the concentration difference between the inside and the outside of the space for air conditioning brings about the introduction of oxygen into the objective space for air conditioning and a discharge of carbon dioxide out of the space for air conditioning.

Also, since the selective separating member has a low permeation coefficient P for hydrocarbon, nitrogen oxide, sulfur oxide and a fine solid component, permeation of hydrocarbon, nitrogen oxide, sulfur oxide and a fine solid component is not allowed. Accordingly, hydrocarbon, nitrogen oxide, sulfur oxide and a fine solid component are prevented from intruding into the space for air conditioning.

The concentration difference of oxygen and carbon dioxide between the outer air and the inner air resulting from the breathing of an occupant in the objective space for air conditioning is generally 1,000 ppm or more, whereas the concentration difference of hydrocarbon, nitrogen oxide, sulfur oxide and a fine solid component between the outer air and the inner air is generally 10 ppm or less at a maximum, on the road having a lot of traffic.

The selective separating member is characterized by exerting a permeation function depending on the concentration difference of a permeable gas between the space for air conditioning and the outside of the space of air conditioning, and therefore as described in above item 1, it is preferably composed of a construction material satisfying the relationship of $P_1/P_2 > 10$ wherein $P_1$ is the permeation coefficient of oxygen and carbon dioxide and $P_2$ is the permeation coefficient $P_2$ of hydrocarbon, nitrogen oxide, sulfur oxide and a fine solid component.

When this relationship is satisfied, the ratio of the permeated amount of oxygen and carbon dioxide to the permeated amount of hydrocarbon, nitrogen oxide, sulfur oxide and a fine solid component becomes about 1,000:1, that is, the concentration difference of hydrocarbon, nitrogen oxide, sulfur oxide and a fine solid component becomes 1 ppm (10 ppm/10) for 1,000 ppm of oxygen and carbon dioxide, so that the selective separating member has a sufficiently high performance of permeating oxygen and carbon dioxide and blocking hydrocarbon, nitrogen oxide, sulfur oxide and a fine solid component.

The performance necessary for the selective separating member is considered to vary depending on the installation site. For example, in a place where the area of the selective separating member is limited, a material formed into a thin film or the like in order to have high permeability per unit area is required. The permeability may also be elevated by using a material having a fibrous shape or the like, such as an air filter. Furthermore, when the temperature in the periphery of the system is high, a porous material or the like having high heat resistance is required.

Therefore, as is described in above item 2, when the selective separating member is formed to have a porous shape, a fibrous shape, a thin film shape or a composite shape thereof, an appropriate selective separating member according to the installation site can be obtained.

In the case where the selective separating member has a porous shape, as is described in above item 3, when the selective separating member having a porous shape is formed to have a pore diameter of 5 nm or less, a Knudsen flow is not generated and furthermore, permeation of a fine solid component of 10 nm or more causing cancer by depositing in a human body can be prevented.

In the case where the selective separating member has a fibrous shape, as is described in above item 4, when the selective separating member having a fibrous shape is formed to have a function of blocking hydrocarbon, nitrogen oxide, sulfur oxide and a fine solid component, the permeability of oxygen and carbon dioxide can be elevated.

In the case where the selective separating member has a thin film shape, since the permeated amount and the film thickness of the selective separating member are inversely proportional, the film thickness value is preferably smaller. Accordingly, as is described in above item 5, when the selective separating member is formed to have a film thickness of 500 nm or less, the permeability of oxygen and carbon dioxide can be elevated. The film thickness is more preferably 100 nm or less.

Also, as is described in above item 6, the function of the selective separating member, that is, the function of blocking hydrocarbon, nitrogen oxide, sulfur oxide and a fine solid component, is preferably achieved by adsorption, absorption, decomposition or a surface reaction. The adsorption and absorption may be performed on the surface or within the film of the selective separating member.

In the adsorption, hydrocarbon, nitrogen oxide, sulfur oxide and a fine solid component, when their concentration is increased, are mainly physically retained on the selective separating member, and these components are again released into the outer air when their concentration is decreased, whereby the adsorption performance of the selective separating member can be regenerated.

In the absorption, hydrocarbon, nitrogen oxide, sulfur oxide and a fine solid component can be blocked by mainly chemically immobilizing these components on the selective separating member.

In the decomposition, the adsorbed or absorbed hydrocarbon, nitrogen oxide or sulfur oxide can be chemically decomposed, and thereby made odorless or harmless.

In the surface reaction, the adsorption of hydrocarbon, nitrogen oxide, sulfur oxide and a fine solid component is selectively made difficult by the surface structural feature of the selective separating member to prevent their intrusion into the film, whereby these components can be blocked.

Examples of the decomposing means include an electrical decomposition system, a thermal decomposition system, a chemical decomposition system using chemicals or the like, and a biological decomposition system using microorganisms or the like. Furthermore, a method of enhancing the capacity by combining these systems may also be employed.

In the case where the selective separating member comprises an organic polymer, as is described in the item 7, when the organic polymer contains a composition having electrical conductivity, the supply of an electron necessary for the surface reaction is facilitated, and furthermore, the hydrocarbon, nitrogen oxide and sulfur oxide adsorbed to the surface can be easily decomposed of.

Examples of an organic polymer containing a composition having electrical conductivity include a polyacetylene-based polymer, a polyparaphenylene-based polymer, and a 5-membered heterocyclic polymer-based polymer.

Meanwhile, when the selective separating member has a large surface roughness, the area allowing for contact of outer air with the selective separating member surface increases, and in turn the permeated amount of oxygen or carbon dioxide can be increased. Therefore, as is described in above item 8, when the selective separating member is made to have a surface roughness (Ra) of 6.0 nm or more, control of physical properties of the selective separating member surface, such as control of compatibility between the member surface and oxygen, control of pore diameter and control of molecular orientation such as crystallization degree, can be realized in addition to an increase of surface area.

Examples of the method for increasing the surface roughness of the selective separating member include a method of plasma-treating the selective separating member surface, a method of irradiating ions, a method of applying an ozone treatment, a method of applying a heat treatment, and a method of applying a treatment with chemicals. By such a method, control of physical properties of the selective separating member surface, such as control of compatibility between the member surface and oxygen, control of pore diameter and control of molecular orientation (e.g., crystallization degree), can be realized in addition to an increase of surface area.

Ideally, when two features of permeability and blocking property can be simultaneously possessed by one selective separating members, a simple system construction can be advantageously achieved. However, it may also be possible to combine selective separating members having features of permeability and blocking property, respectively.

In this regard, as is described in above item 9, when the selective separating member is constructed to comprise a first selective separating member having a function of allowing preferential permeation of oxygen and carbon dioxide, and a second selective separating member having a function of blocking hydrocarbon, nitrogen oxide, sulfur oxide and a fine solid component, the permeation performance of the first selective separating member, and the blocking performance of the second selective separating member can be optimized, so that the performance of the selective separating member can be optimized.

Incidentally, as described above, the film thickness of the first selective separating member and the second selective separating member is 500 nm or less, preferably 100 nm or less, and therefore, the selective separating member by itself cannot maintain its shape.

Accordingly, as is described in above item 10, when the first selective separating member, and the second selective separating member are put into close contact and the selective separating member is supported by a support layer from at least one side of the first and second selective separating members put into close contact, the thin film shape of the selective separating member can be maintained by the support layer.

If the first selective separating member and the second selective separating member are distinctly separated from the support, that is, if each selective separating member is a body different from the support layer, when each selective separating member is deformed by some force imposed thereon, each selective separating member may be broken.

Accordingly, as is described in above item 11, when the selective separating member is constructed to comprise a support layer containing the first selective separating member in the layer and a support layer containing the second selective separating member in the layer, even if force is imposed on the first selective separating member and the second selective separating member, each selective member cannot be readily broken, because each selective separating member is supported by the support layer.

Furthermore, as is described in above item 12, when the first selective separating member has a support layer in which the permeation ratio of oxygen and carbon dioxide is gradually changed in the permeation direction in the support layer, oxygen and carbon dioxide cannot readily permeate in the portion having a low permeation ratio, but since oxygen more readily permeates as the permeation ratio increases, the selective separating member as a whole allows the permeation of oxygen and carbon dioxide. Also, when the second selective separating member has a support layer in which the permeation ratio of hydrocarbon, nitrogen oxide, sulfur oxide and a fine solid component is gradually changed in the permeation direction in the support layer, the hydrocarbon, nitrogen oxide, sulfur oxide and a fine solid component can be blocked in the portion having a low permeation ratio.

By using the above-described air conditioning system, hydrocarbon, nitrogen oxide, sulfur oxide and a fine solid component can be blocked when permeating from the outer air, but the components generated in the vehicle cabin or carried over by an occupant or the like from outside the vehicle cabin may not be removed in a short time.

Accordingly, as is described in above item 13, when deodorizing means for deodorization is provided in the objective space of air conditioning, the inside of the air conditioning space can be deodorized.

The deodorizing means includes means of adsorbing the above-described components by an adsorbent, and means of decomposing those components. Examples of a material having adsorptivity include a carbon material, such as activated carbon particles and activated carbon fibers, an inorganic material such as zeolite, an absorbing solution and a fibrous substance impregnated with an absorbing solution. Examples of the decomposing method include an electrical decomposition system, a thermal decomposition system, a chemical decomposition system using chemicals or the like, and a biological decomposition system using microorganisms or the like.

The above-described apparatus having a deodorizing function can remove undesired components concerning air quality in the space for air conditioning, but in order to eliminate problems such as an increase of the concentration of the undesired components in the space for air conditioning or fogging of the glass or the like in the space, it is effective to introduce the outer air into the space of air conditioning by, as is described in above item 14, providing outer air introducing means for the introduction of outer air in the space for air conditioning, and for example, introducing the outer air at certain intervals for a certain time.

At the time of introducing the outer air, as is described in above item 15, when the outer air introducing means is constructed to be capable of adjusting the volume of outer air introduced into the space for air conditioning based on arbitrarily set outer-air volume introduction conditions, such as time for which outer air is introduced, interval, volume introduced, inlet from which outer air is introduced, and gas concentration in the space for air conditioning, the outer air can be optimally introduced into the space of air conditioning. With regard to the method of introducing outer air, for example, a method of changing the opening degree of the outer air port may be used.

Also, in order to optimally introduce the outer air into the space for air conditioning, the outer air is preferably introduced depending on the circumstance in the space of air conditioning, such as gas concentration. Accordingly, as is described in above item 16, when a sensor for detecting the gas concentration in the space of air conditioning is provided and the outer air introducing means is constructed to be capable of adjusting the volume of outer air introduced into the space for air conditioning based on the value of gas concentration detected by the sensor with respect to the gas concentration value set as the outer-air volume introduction conditions, outer air having an optimal gas concentration can be introduced.

Incidentally, the gas concentration includes a concentration of a fine solid component as well as concentrations of oxygen, carbon dioxide, hydrocarbon, nitrogen oxide, sulfur oxide and the like. Also, the sensor includes a concentration sensor for oxygen, carbon dioxide, hydrocarbon, nitrogen oxide and sulfur oxide and a sensor of counting the number of fine solid component pieces.

The space for air conditioning requires introduction of oxygen and discharge of carbon dioxide and may be a space where hydrocarbon, nitrogen oxide, sulfur oxide and a fine solid component need to be blocked. As for such a space, as is described in above item 17, the space for air conditioning is preferably a space occupied by an occupant in a vehicle.

More specifically, the space in the cabin of a vehicle, particularly, an automobile, is exposed to an environment where consumption of oxygen or emission of carbon dioxide occurs due to the breathing of an occupant or when driving in an area of heavy traffic, hydrocarbon, nitrogen oxide, VOCs, a fine solid component and the like exhausted from other vehicles are likely to enter the cabin space. Therefore, when this air conditioning system is applied to the inside of an automobile cabin, a comfortable space can be realized in the cabin. Of course, this air conditioning system can be effectively applied not only to an automobile, but also to a vehicle such as bus, train, monorail or airplane.

Next, referring to the appended drawings, some of the above-described preferred embodiments according to the present invention are further described. Note, however, that the embodiments of the present invention are not limited to the following embodiments and various embodiments may be conceived without departing from the technical scope of the present invention.

First Embodiment

Figure 1:
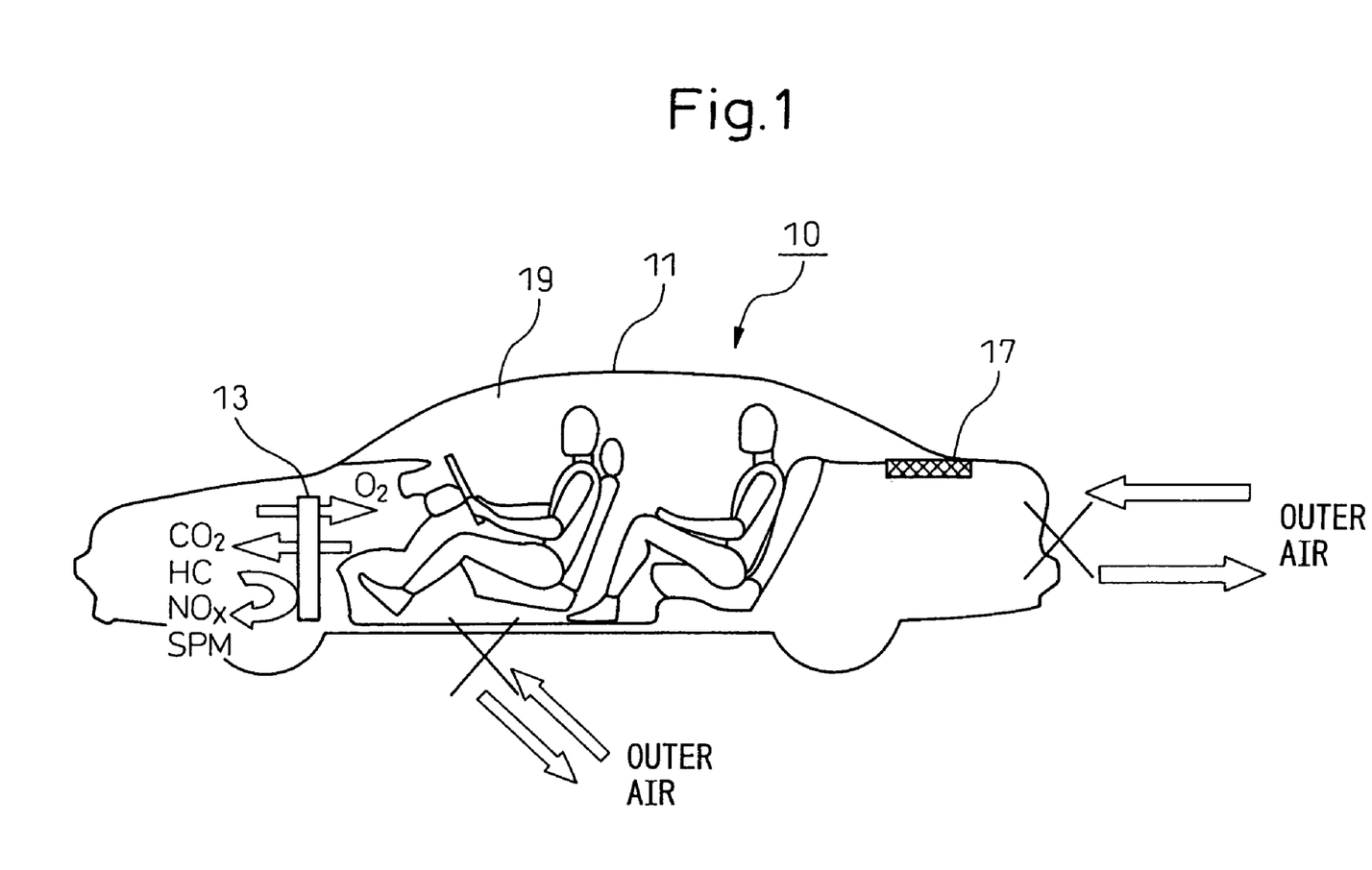
FIG. 1 shows a schematic cross-sectional view of the vehicle according to one embodiment of the present invention, FIGS. 2A, 2B and 2C each show a perspective view of the construction of the selective separating member.

FIG. 1 is a schematic cross-sectional view of a vehicle having incorporated therein the air conditioning system of this embodiment. First, before describing the illustrated vehicle of the present invention, the prior art vehicle 30 will be described referring to FIG. 5.

Figure 5:
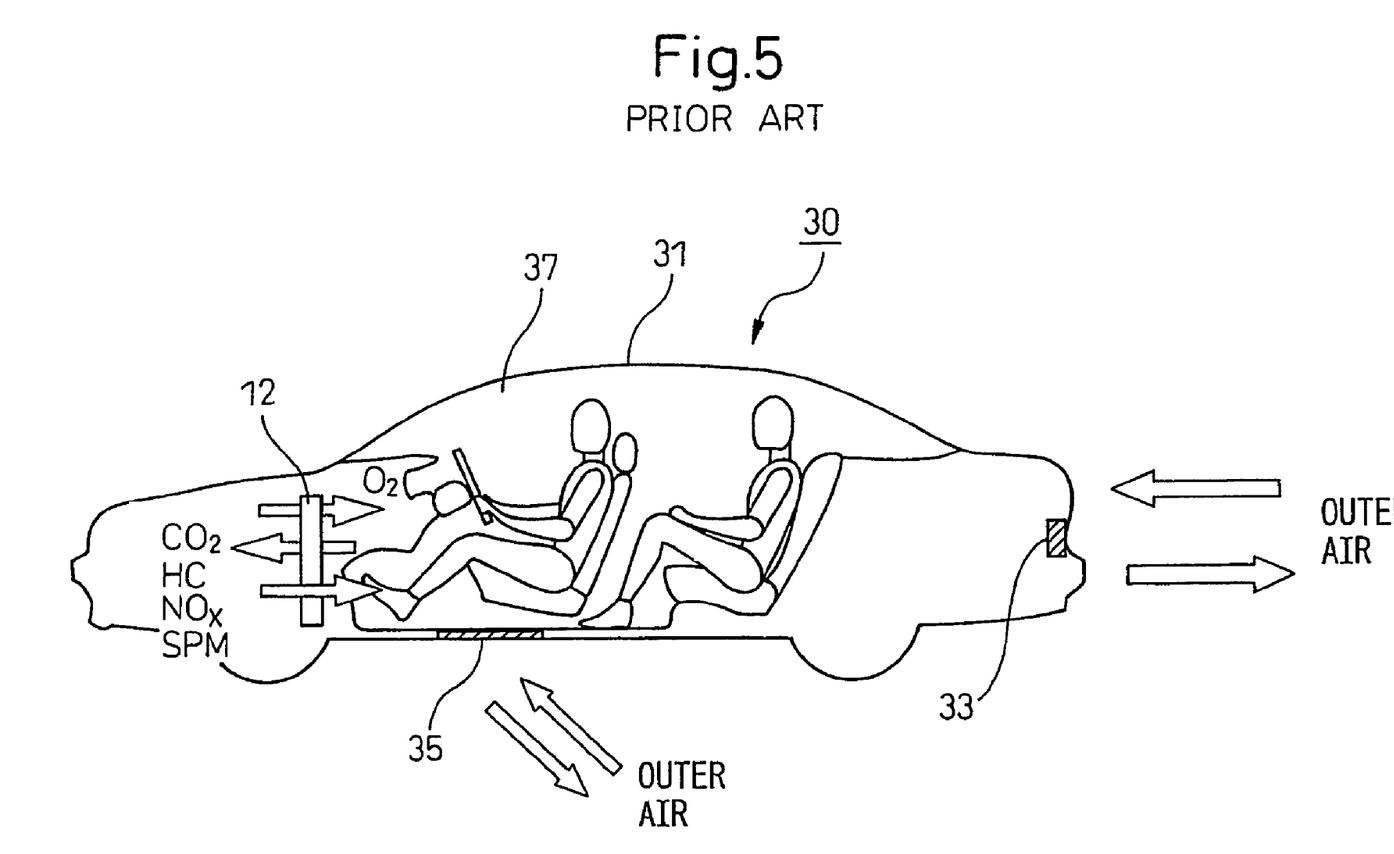
FIG. 5 shows a schematic cross-sectional view of a prior art vehicle.

A conventional vehicle 30 comprises an air conditioner (not shown), and the air conditioner has an outer air introduction mode of introducing outer air into the vehicle cabin 37, and an inner air circulation mode of circulating air in the vehicle cabin 37 without introducing outer air. Also, an underfloor vent 35 and a trunk vent 33 are provided under the floor and in the trunk, respectively. These are intended to reduce the pressure variation in the cabin 37 occurring when the opening and closing of a door (not shown).

A filter 12 is disposed under the feet of an occupant in the front seat of the cabin 37 and at the same time, in the air supply route of the air conditioner. This filter 12 allows not only the permeation of oxygen and carbon oxide, but also the permeation of hydrocarbon, nitrogen oxide, sulfur oxide and a fine solid component.

In this way, in a conventional vehicle 30, when the air conditioner is set to the outer air introduction mode, hydrocarbon, nitrogen oxide, sulfur oxide and a fine solid component contained in the outer air enter into the cabin 37, and even when the air conditioner is not set to the outer air introduction mode, outer air intrudes from the underfloor vent 35 and the trunk vent 33.

On the other hand, the vehicle 10 of the present invention shown in FIG. 1 is not equipped with a vent such as an underfloor vent 35 and trunk vent 33 of a conventional vehicle 30. Also, the air conditioner (not shown) has only an inner air circulation mode. The cabin 19 of the vehicle 10 comprises a cabin wall 11, a selective separating member 13 and an inner/outer air damper 17 and forms a semi-closed space where inflow or outflow of air does not occur except for through the selective separating member 13 and the inner/outer air damper 17.

The cabin wall 11 is composed of a gas-impermeable material such as iron, aluminum and glass. Also, the selective separating member 13 has a property of allowing preferential permeation of oxygen and carbon dioxide and a property of blocking nitrogen oxide exhausted into air from the vehicle, such as hydrocarbon (HC) and $NO_2$, and blocking a nanometer-size diesel carbon (fine solid particle) and the like and is disposed under the feet of an occupant in the front seat of the cabin 19 and at the same time, in the air supply route of the air conditioner.

(Construction of Selective Separating Member)

Figure 2A:
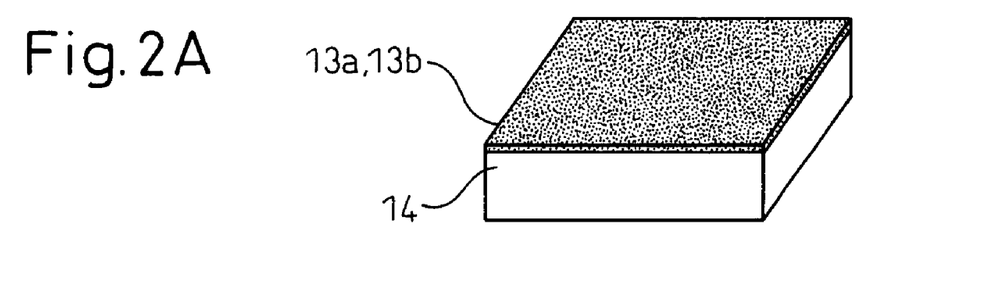
Figure 2B:
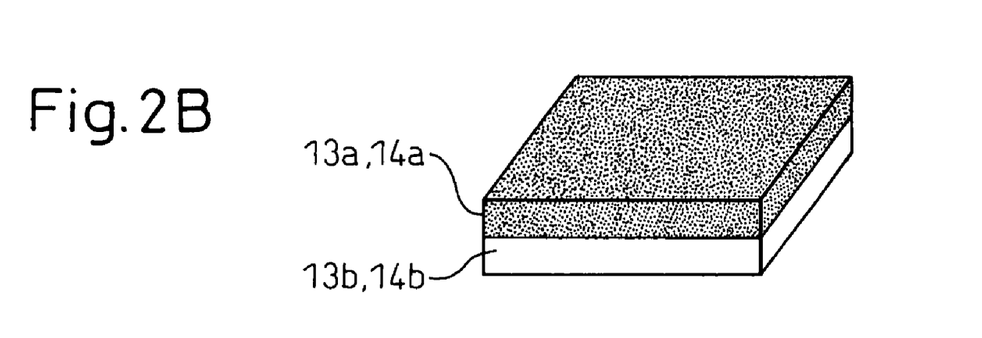
Figure 2C:
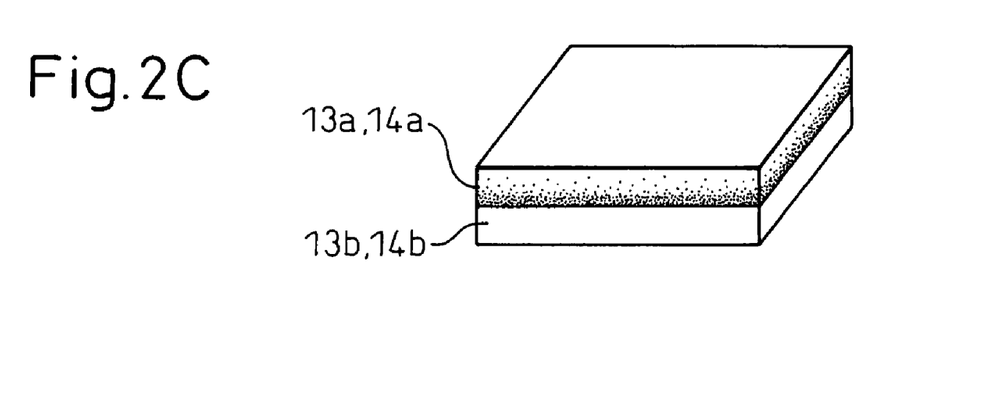

The construction of the selective separating member 13 is described referring to FIGS. 2A, 2B and 2C, in which a perspective view showing the construction of the selective separating member 13 is illustrated. FIGS. 2A, 2B and 2C each show the embodiments where the selective separating member has a construction that a first selective separating member 13a having a function of allowing preferential permeation of oxygen and carbon dioxide, and a second selective separating member 13b having a function of blocking, adsorbing, absorbing or decomposing hydrocarbon, nitrogen oxide, sulfur oxide and a fine solid component are separated.

In Construction Example 1 shown in FIG. 2A, the selective separating member has a construction that a film structure obtained by integrally contacting a first selective separating member 13a and a second selective separating member 13b is disposed on a support 14.

The first selective separating member 13a and the second selective separating member 13b is each formed of an organic polymer. In Construction Example 1, the organic polymer is a silicone polymer, but the organic polymer may be any one of organic polymers comprising a composition having electrical conductivity, such as a polyacetylene-based polymer, a polyparaphenylene-based polymer, a 5-membered heterocyclic polymer-based polymer, or the like.

The first selective separating member 13a and the second selective separating member 13b allow the permeation of a gas, and therefore a small film thickness is advantageous, but when formed thinly, the film is reduced in strength and easily broken. Therefore, the film thickness is preferably 500 nm or less or more preferably from 50 to 100 nm. In this embodiment, the film thickness is 100 nm.

In Construction Example 1, the flat film is used as it is, because when the first selective separating member 13a and the second selective separating member 13b are folded, thereby sometimes resulting in cracking on the protruding film surface.

Next, in Construction Example 2 shown in FIG. 2B, the selective separating member has a construction that the first selective separating member 13a and the second selective separating member 13b are contained in supports 14a and 14b, respectively. Each selective separating member portion and each support portion of the first selective separating member 13a, support 14a, the second selective separating member and support 14b are not distinctly separated, and the selective separating member as a whole has permeation ability and separation ability.

Also in Construction Example 3 shown in FIG. 2C, the selective separating member has a construction that the first selective separating member 13a and the second selective separating member 13b are contained in supports 14a and 14b, respectively, but the composition of the film gradually changes in the thickness direction. More specifically, the first selective separating member 13a is contained such that the permeation ratio of oxygen and carbon dioxide gradually changes in the permeation direction, and the second selective separating member 13b is contained such that the permeation ratio of hydrocarbon, nitrogen oxide, sulfur oxide and a fine solid component gradually changes in the permeation direction.

(Surface Roughness of Selective Separating Member)

With regard to the selective separating member 13, the first selective separating member 13a and the second selective separating member 13b (hereinafter, two members of the first selective separating member 13a and second selective separating member 13b are simply referred to as a "selective separating member 13"), the surface roughness Ra and oxygen permeation coefficient K of the selective separating members shown in Table 1 are described. In Table 1, the values of oxygen permeation coefficient K differ depending on the surface roughness Ra of the selective separating member 13 as shown.

As shown in Table 1, along with an increase in the value of the surface roughness Ra of the selective separating member 13, the oxygen permeation coefficient K of the selective separating member 13 becomes greater. The average surface roughness of the untreated selective separating member is Ra=5.5 nm and the oxygen permeation coefficient is $3.2 \times 10^{-9}$. The oxygen coefficient becomes $9.2 \times 10^{-9}$ by increasing the surface roughness of this selective separating member to Ra=6.6 nm and becomes $9.1 \times 10^{-8}$ by an increase to Ra=7.5 nm. Thus, the oxygen permeation coefficient K is increased by about 30 times over that of the untreated member.

TABLE 1

| Surface Roughness: Ra | Untreated | Treated | |
|---|---|---|---|
| [nm] | 5.5 | 6.6 | 7.5 |
| Oxygen Permeation Coefficient: K [$cm^3 \cdot cm/cm^2 \cdot sec \cdot cmHg$] | $3.2 \times 10^{-9}$ | $9.2 \times 10^{-9}$ | $9.1 \times 10^{-9}$ |

Figure 3:
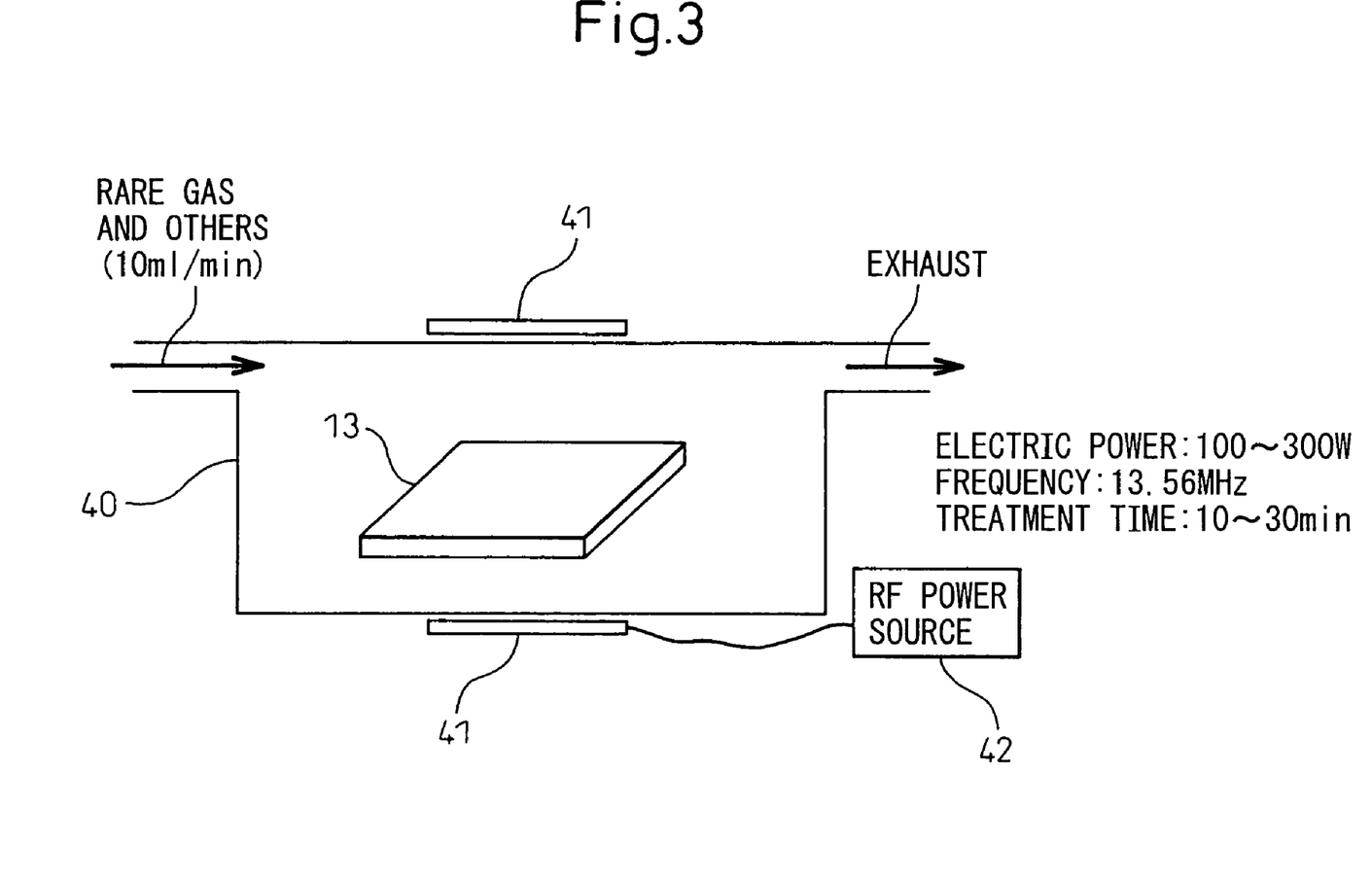
FIG. 3 shows a schematic view illustrating the method of surface-modifying the material by plasma treatment so as to enhance the oxygen permeability of the selective separating member.

In order to increase the oxygen permeation coefficient K by changing the surface roughness Ra, a method of physically/chemically treating the surface of the selective separating member 13 may be used. For example, FIG. 3 shows a method of surface-modifying the material by plasma treatment so as to enhance the oxygen permeability of the selective separating member 13.

For plasma treatment, the selective separating member 13 is disposed in a pressure-reducible chamber 40 equipped with an RF power source. Here, the selective separating member 13 is placed on the cathode side of one of the parallel-plane electrodes 41. The RF power source 42 has an electric power of 100 to 300 W and a frequency of 15.36 MHz, and it is effective for a treatment time of 10 to 30 minutes.

(Introduction of Outer Air)

Figure 4A:
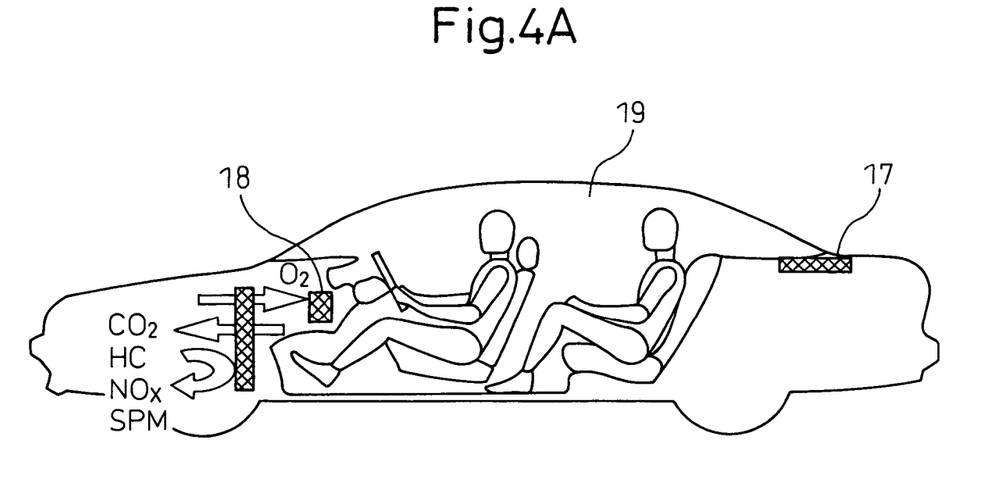
FIG. 4A shows a schematic view illustrating the method of controlling the oxygen concentration in the cabin of the vehicle.
Figure 4B:
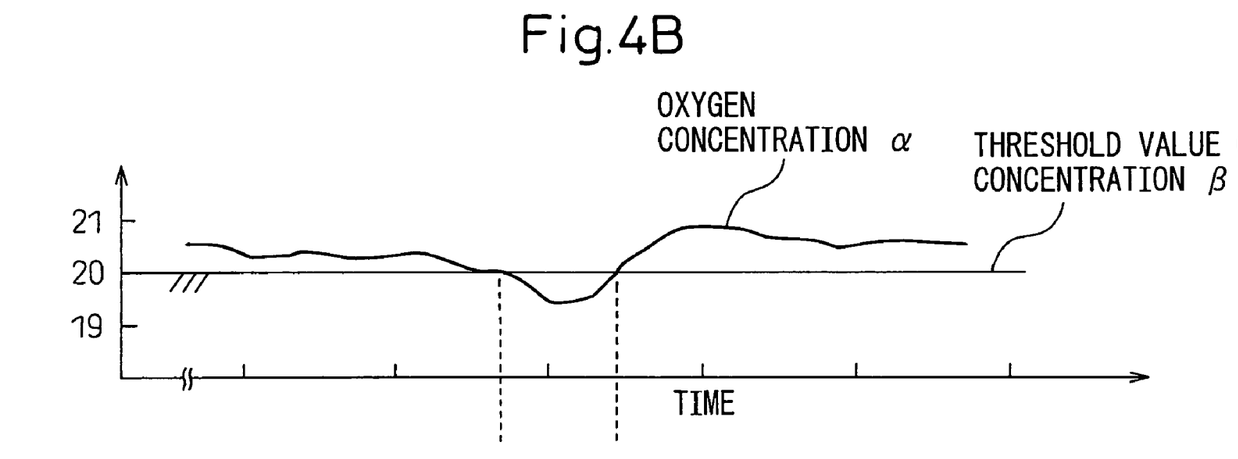
FIG. 4B is a graph showing the oxygen concentration in the cabin with regard to lapse of time.
Figure 4C:
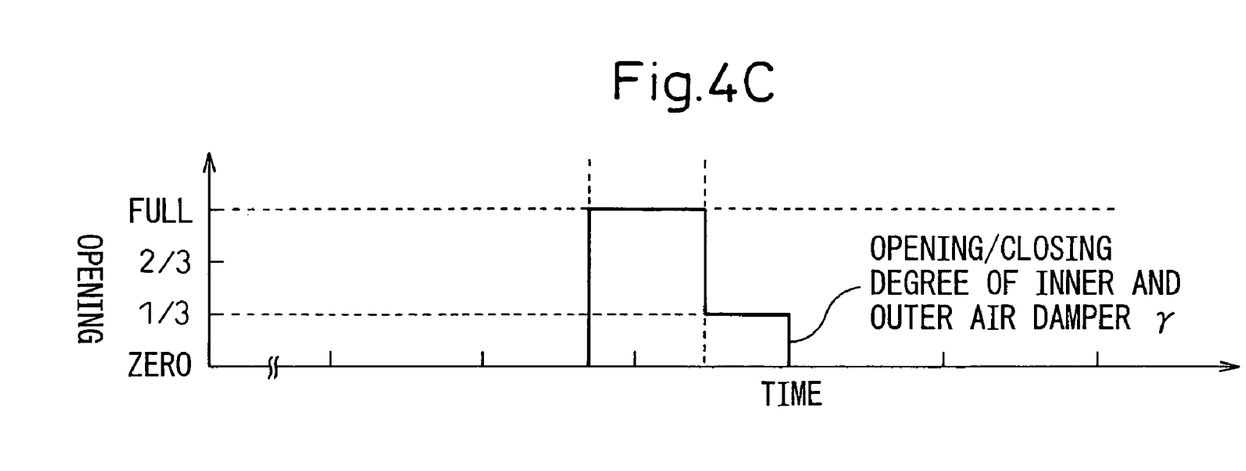
FIG. 4C is a graph showing the opening/closing degree of an inner/outer air damper with regard to lapse of time.

FIGS. 4A, 4B and 4C illustrate a method of controlling the oxygen concentration in the cabin 19 of the vehicle. FIG. 4A is a view showing a state where an oxygen sensor 18 is fixed, FIG. 4B is a graph showing the change of oxygen concentration in the cabin 19 measured by the oxygen sensor 18, and FIG. 4C is a graph showing the opening degree of the inner/outer air damper 17. Note in FIGS. 4B and 4C that the graphs have the same time interval.

As described above, this air conditioning system comprises a selective separating member 13 having a function of allowing preferential permeation of oxygen and carbon dioxide consumed by an occupant in the cabin 19, and at the same time, blocking hydrocarbon, nitrogen oxide, sulfur oxide and a fine solid component.

However, when the permeation performance of the selective separating member 13 is deteriorated for some reason, oxygen in an amount compensating for the amount of oxygen consumed by the occupant in the cabin 19 may not be introduced. In order to prevent this, the oxygen concentration α in the cabin 19 is detected as shown in FIG. 4B by the oxygen sensor 18 fixed in the cabin 19 as shown in FIG. 4A and whether or not the oxygen concentration α detected is decreased below the concentration threshold value β (20%, in FIG. 4B) is controlled by the control part (not shown). When judged in the control part (not shown) that the oxygen concentration α is decreased below the concentration threshold value β, the inner/outer air damper 17 is opened and outer air is temporarily introduced into the cabin 19, whereby the oxygen can be increased.

In the control part, the opening degree γ of the inner/outer damper 17 is set at a plurality of stages (three stages, in FIG. 4C) as shown in FIG. 4C. Also, the concentration threshold value β of the oxygen concentration α can be freely set, so that the control value of the oxygen concentration in the cabin 19 can also be changed.

(Characteristic Features of Air Conditioning System)

According to the air conditioning system described above, not only discharge of carbon dioxide out of the cabin and introduction of oxygen into the cabin 19 can be achieved by utilizing the difference in concentration of each of oxygen and carbon dioxide between the inside and the outside of the cabin, but also hydrocarbon, nitrogen oxide, sulfur oxide, a fine solid component and the like can be blocked, so that the inside of the cabin 19 can be kept comfortable.

More specifically, when an occupant or the like is present in the cabin 19, the oxygen concentration in the cabin 18 gradually decreases and the concentration of carbon dioxide gradually increases. However, since the oxygen concentration and carbon dioxide concentration outside the cabin 19 are constant, there are generated concentration differences such that the oxygen concentration is high outside the cabin 19 and low in the cabin, but on the other hand, the carbon dioxide concentration is low outside the cabin 19 and high in the cabin.

At this time, the first selective separating member 13a and the second selective separating member 13b have a high solubility coefficient S and a high diffusion coefficient D for oxygen or carbon dioxide, and therefore oxygen or carbon dioxide after dissolving in the first selective separating member 13a and the second selective separating member 13b diffuses from the high concentration side to the low concentration side, that is, the concentration difference between the inside and the outside of the cabin brings about an introduction of oxygen into the cabin and a discharge of carbon dioxide out of the cabin.

Also, since the first selective separating member 13a and the second selective separating member 13b have a low solubility coefficient S for hydrocarbon, nitrogen oxide, sulfur oxide and a fine solid component, no dissolution in the first selective separating member 13a and the second selective separating member 13b and in turn, no permeation through the first selective separating member 13a and the second selective separating member 13b occur. Accordingly, hydrocarbon, nitrogen oxide, sulfur oxide and a fine solid component are prevented from entering into the cabin.

The first selective separating member 13a and the second selective separating member 13b are composed of a material satisfying the relationship of P1/P2>10 wherein P1 is the permeation coefficient of oxygen and carbon dioxide and P2 is the permeation coefficient of hydrocarbon, nitrogen oxide, sulfur oxide and a fine solid component. Therefore, the ratio of the permeated amount of oxygen and carbon dioxide to the permeated amount of hydrocarbon, nitrogen oxide, sulfur oxide and a fine solid component becomes about 1,000:1, so that a sufficiently high blocking performance can be attained.

The first selective separating member 13a and the second selective separating member 13b are each formed into a thin film, and therefore the permeability per unit area is high, so that the permeability can be elevated even in a place having a limited installation area like the cabin 19.

Also, the first selective separating member 13a and the second selective separating member 13b each has a film thickness of 500 nm or less (in this embodiment, 100 nm), and therefore the permeability of oxygen and carbon dioxide can be elevated.

The function of the first selective separating member 13a and the second selective separating member 13b, that is, the function of blocking hydrocarbon, nitrogen oxide, sulfur oxide and a fine solid component, is achieved by adsorption, absorption or decomposition. In the adsorption, hydrocarbon, nitrogen oxide, sulfur oxide and a fine solid component are mainly physically held when their concentration is increased, and these components are again released into the outer air when their concentration is decreased, whereby the adsorption performance of the second selective separating member 13b can be regenerated.

The absorption, hydrocarbon, nitrogen oxide, sulfur oxide and a fine solid component can be blocked by mainly chemically immobilizing these components on the second selective separating member 13b.

In the decomposition, the adsorbed or absorbed hydrocarbon, nitrogen oxide or sulfur oxide can be chemically decomposed and thereby made odorless or harmless.

Examples of the decomposing means include an electrical decomposition system, a thermal decomposition system, a chemical decomposition system using chemicals or the like, and a biological decomposition system using microorganisms or the like. Furthermore, a method of enhancing the capacity by combining these systems may also be employed.

The first selective separating member 13a and the second selective separating member 13b is each formed of a polyaniline-based organic polymer having electrical conductivity, so that the supply of an electron necessary for the surface reaction is facilitated, and furthermore the hydrocarbon, nitrogen oxide and sulfur oxide adsorbed to the surface can be easily decomposed.

The first selective separating member 13a and the second selective separating member 13b have a surface roughness Ra of 6.0 nm or more (for example, 6.5 nm or 6.6 nm), and therefore control of physical properties on the surfaces of the first selective separating member 13a and the second selective separating member 13b, such as control of compatibility between the member and oxygen, control of pore diameter and control of molecular orientation (e.g., crystallization degree), can be realized in addition to the increase of surface area.

The selective separating member 13 is constructed to comprise a first selective separating member 13a having a function of allowing preferential permeation of oxygen and carbon dioxide and a second selective separating member 13b having a function of blocking hydrocarbon, nitrogen oxide, sulfur oxide and a fine solid component, so that the permeation performance of the first selective separating member 13a and the blocking performance of the second selective separating member 13b can be optimized, and in turn the performance of the selective separating member 13 can be optimized.

As shown in FIG. 2A, the first selective separating member 13a and the second selective separating member 13b are put into close contact, and furthermore the selective separating member is supported by a support 14 from the second selective separating member 13b side, so that notwithstanding a very small film thickness of 100 nm for the first selective separating member 13a and the second selective separating member 13b, the shape as the selective separating member can be maintained.

In the case of the selective separating member 13 shown in FIG. 2B, the selective separating member 13 is constructed to comprise a support 14 containing the first selective separating member 13a in the layer and a support 14 containing the second selective separating member 13b in the layer, and the thin film shape of each of the first selective separating member 13a and the second selective separating member 13b can be maintained by the support 14, so that even if force is imposed on the first selective separating member 13a and the second selective separating member 13b, each selective member cannot be readily broken, because each selective separating member is supported by the support 14.

In the case of the selective separating member 13 shown in FIG. 2C, the first selective separating member 13a has a support 14 in which the permeation ratio of oxygen and carbon dioxide gradually changes in the permeation direction in the support 14. Therefore, oxygen and carbon dioxide cannot readily permeate in the portion having a low permeation ratio, but since oxygen and carbon dioxide increase as the permeation ratio increases, the selective separating member as a whole allows easy permeation of oxygen and carbon dioxide. Also, the second selective separating member 13b has a support 14 in which the permeation ratio of hydrocarbon, nitrogen oxide, sulfur oxide and a fine solid component gradually changes in the permeation direction in the support 14, so that the hydrocarbon, nitrogen oxide, sulfur oxide and a fine solid component can be blocked in the portion having a low permeation ratio.

Also, an inner/outer air damper 17 is provided in the cabin 19 and outer air is introduced into the cabin 19 at certain intervals for a certain period of time. Since outer air can be introduced into the cabin 19, undesired components adversely affecting on the air quality in the cabin 19 can be removed and problems such as fogging of the glass or the like in the space can be eliminated.

In the inner/outer air damper 17, the conditions of introduction of outer air into the cabin 19, such as opening degree of the inner/outer air damper 17 and oxygen concentration, can be arbitrarily set, so that comfortable outer air can be introduced into the cabin 19.

The outer air is introduced into the cabin 19 based on the oxygen concentration in the cabin 19 detected by the oxygen sensor 18, so that the oxygen concentration in the cabin 19 can be made optimal.

Other than the oxygen sensor 18, a concentration sensor for carbon dioxide, hydrocarbon, nitrogen oxide and sulfur oxide or a sensor of counting the number of fine solid component pieces may be used to adjust the concentration of each component in the cabin.

Hereinabove, some embodiments of the present invention were described, but the present invention is not limited to these embodiments and thus the present invention can be carried out in a plurality of other embodiments, if desired.

(1) For example, in the embodiments above, a thin film-shaped material is used as the selective separating member 13, but in place of the thin film-shaped material, a porous material having a pore diameter of 5 mm or less may be used.

When such a material is used, a Knudsen flow is not generated and furthermore, permeation of a fine solid component of 10 nm or more causing cancer in a human can be prevented.

(2) The porous material has high heat resistance, and therefore is effective when the temperature in the outside is high, for example, when the selective separating member 13 is disposed in the vicinity of an engine room.

(3) Also, when the selective separating member 13 is formed of a fibrous material having a function of blocking hydrocarbon, nitrogen oxide, sulfur oxide and a fine solid component in place of the thin film-shaped material, the permeability of oxygen and carbon dioxide can be elevated.

(4) A fibrous material having a function of blocking hydrocarbon, nitrogen oxide, sulfur oxide and a fine solid component may also be used in place of the thin film-shaped material.

(5) In the selective separating member 13 of the embodiments above, the permeation of oxygen and carbon dioxide and the blocking of hydrocarbon, nitrogen oxide, sulfur oxide and a fine solid component are achieved by a thin-film material having a function of adsorption, absorption or decomposition, but the selective separating member 13 may be formed of a thin-film material capable of surface-reacting with those components.

(6) In the cabin 19, a deodorizing device for adsorbing hydrocarbon, nitrogen oxide, sulfur oxide and a fine solid component by a material capable of adsorbing these components, such as carbon material (e.g., activated carbon particles, activated carbon fibers), inorganic material (e.g., zeolite), absorbing solution and a fibrous substance impregnated with an absorbing solution, or a deodorizing device employing a method of decomposing hydrocarbon, nitrogen oxide, sulfur oxide and a fine solid component, such as electrical decomposition system, thermal decomposition system, chemical decomposition system using chemicals or the like, and a biological decomposition system using microorganisms or the like, may be provided.

(7) The space for air conditioning requires introduction of oxygen and the discharge of carbon dioxide and may be a space where hydrocarbon, nitrogen oxide, sulfur oxide and a fine solid component need to be blocked. As for such a space, the space may not only be in an automobile, but also in a vehicle such as a train, monorail or airplane may be applied.

Note that the cabin 19 corresponds to the space for air conditioning in the air conditioning system, the cabin wall 11 corresponds to the wall not allowing permeation of a gas, the inner/outer damper 17 corresponds to the outer air introducing means, and the oxygen sensor 18 corresponds to the sensor.

The invention claimed is:

1. An air conditioning system comprising a gas-impermeable wall defining a space for air conditioning, and a selective separating member disposed in said wall as a part of said wall, and having a function of allowing preferential permeation of oxygen and carbon dioxide and at the same time, blocking the permeation of hydrocarbons, nitrogen oxide, sulfur oxide and a fine solid component, in which
said selective separating member has a film shape having a thickness of 100 nm or less and has a surface roughness of 6.0 nm or more.

2. The air conditioning system as set forth in claim 1, wherein said selective separating member has a surface roughness of 7.5 nm or more.

3. The air conditioning system as set forth in claim 1, wherein said selective separating member is porous having a pore diameter of 5 nm or less.

4. The air conditioning system as set forth in claim 1, wherein the function of said selective separating member of blocking the permeation of hydrocarbons, nitrogen oxide, sulfur oxide and a fine solid component is achieved by adsorption, absorption, decomposition or surface reaction.

5. The air conditioning system as set forth in claim 1, wherein said selective separating member comprises:
a first selective separating member having said function of allowing preferential permeation of oxygen and carbon dioxide, and
a second selective separating member having said function of blocking the permeation of hydrocarbon, nitrogen oxide, sulfur oxide and a fine solid component.

6. The air conditioning system as set forth in claim 5, wherein said first selective separating member and said second selective separating member are constructed to be in close contact and said selective separating member is supported by a support layer, on at least one side of said first and second selective separating members constructed to be in close contact.

7. The air conditioning system as set forth in claim 6, wherein said selective separating member comprises a first support layer having incorporated therein said first selective separating member and a second support layer having incorporated therein said second selective separating member.

8. The air conditioning system as set forth in claim 7, wherein said first selective separating member has a gradiently changed permeation ratio of oxygen and carbon dioxide in the permeation direction in said first support layer and said second selective separating member has a gradiently changed permeation ratio of hydrocarbons, nitrogen oxide, sulfur oxide and a fine solid component in the permeation direction in said second support layer.

9. The air conditioning system as set forth in claim 1, wherein deodorizing means for deodorization is further provided in said space for air conditioning.

10. The air conditioning system as set forth in claim 1, wherein outer air introducing means for the introduction of outer air is further provided in said space for air conditioning.

11. The air conditioning system as set forth in claim 10, wherein said outer air introducing means is constructed to be capable of adjusting the volume of outer air introduced into said space for air conditioning, based on arbitrarily set outer-air volume introduction conditions.

12. The air conditioning system as set forth in claim 11, wherein a sensor for detecting the gas concentration in said space for air conditioning is further provided and said outer air introducing means is constructed to be capable of adjusting the volume of outer air introduced into said space for air conditioning, based on the value of gas concentration detected by said sensor with respect to the gas concentration value set as said outer-air volume introduction conditions.

13. The air conditioning system as set forth in claim 1, wherein said space of air conditioning is a space for receiving occupants in a vehicle.

\* \* \* \* \*